United States Patent
Fischer et al.

(10) Patent No.: US 6,239,226 B1
(45) Date of Patent: May 29, 2001

(54) BLOCK COPOLYMERS

(75) Inventors: Michael Fischer, Ludwigshafen; Jürgen Koch, Neuhofen, both of (DE)

(73) Assignee: BASF Aktiengesellshcaft, Ludwigshafen (DE)

( * ) Notice: Subject to any disclaimer, the term of this patent is extended or adjusted under 35 U.S.C. 154(b) by 0 days.

(21) Appl. No.: 09/101,699

(22) PCT Filed: Jan. 22, 1997

(86) PCT No.: PCT/EP97/00279

§ 371 Date: Jul. 15, 1998

§ 102(e) Date: Jul. 15, 1998

(87) PCT Pub. No.: WO97/27233

PCT Pub. Date: Jul. 31, 1997

(30) Foreign Application Priority Data

Jan. 25, 1996 (DE) .............................. 196 02 540
Jul. 4, 1996 (DE) .............................. 196 26 838
Jul. 17, 1996 (DE) .............................. 196 28 834

(51) Int. Cl.$^7$ .................................................. C08F 293/00
(52) U.S. Cl. .......................... 525/256; 525/259; 525/263; 525/267; 525/273; 525/285; 525/299; 525/302; 525/309
(58) Field of Search ................... 525/256, 259, 525/263, 267, 273, 285, 299, 302, 309

(56) References Cited

U.S. PATENT DOCUMENTS

| | | |
|---|---|---|
| 4,581,429 | 4/1986 | Solomon et al. . |
| 5,322,912 | 6/1994 | Georges et al. . |
| 5,412,047 | 5/1995 | Georges . |
| 5,552,502 | 9/1996 | Odell et al. . |
| 5,627,248 * | 5/1997 | Koster et al. .......................... 526/217 |
| 6,087,451 * | 7/2000 | Georges et al. ..................... 525/259 |

FOREIGN PATENT DOCUMENTS

01024879 * 7/1987 (JP) .

OTHER PUBLICATIONS

Macromolecules, vol. 27, No. 12, Jun. 6, 1994, Am. Chem. Soc.

* cited by examiner

Primary Examiner—Jeffrey Mullis
(74) Attorney, Agent, or Firm—Keil & Weinkauf

(57) ABSTRACT

A block copolymer obtainable by reacting

A) monomers selected from the group consisting of styrene, α-methylstyrene, acrylonitrile, methacrylonitrile, methyl methacrylate and maleic anhydride to form blocks A having a glass transition temperature Tg of more than 0° C. and B) monomers selected from the group consisting of n-butyl acrylate, methyl acrylate and 2-ethylhexyl acrylate to form blocks B having a glass transition temperature Tg of less than 0° C.

at from 100 to 160° C. in the presence of free-radical initiators and N-oxyl radicals.

5 Claims, No Drawings

BLOCK COPOLYMERS

The present invention relates to block copolymers obtainable by reacting

A) monomers selected from the group consisting of styrene, α-methylstyrene, acrylonitrile, methacrylonitrile, methyl methacrylate and maleic anhydride to form blocks A having a glass transition temperature Tg of more than 0° C. and B) monomers selected from the group consisting of n-butyl acrylate, methyl acrylate and 2-ethylhexyl acrylate to form blocks B having a glass transition temperature Tg of less than 0° C.

at from 100 to 160° C. in the presence of free-radical initiators and N-oxyl radicals.

The present invention also relates to processes for preparing such block copolymers, to their use for producing transparent or translucent films and moldings, and to the transparent or translucent films and moldings obtainable therefrom.

U.S. Pat. No. 5,322,912 discloses processes for preparing styrene homopolymers and copolymers with myrcene.

U.S. Pat. No. 5,412,047 describes processes for preparing homopolymers of n-butyl acrylate.

It is an object of the present invention to provide block copolymers which are notable for a narrow molecular weight distribution and increased elongation at break with good resilience properties, and which are suitable for producing transparent or translucent films and moldings which, moreover, exhibit enhanced weathering resistance.

We have found that this object is achieved by the block copolymers defined at the outset.

We have also found processes for preparing such block copolymers, their use for producing transparent or translucent films and moldings, and the transparent or translucent films and moldings obtainable therefrom.

The monomers A) employed are those which form blocks A having a glass transition temperature of more than 0° C., selected from the group consisting of styrene, α-methylstyrene, acrylonitrile, methacrylonitrile, methyl methacrylate and maleic anhydride, preferably styrene, acrylonitrile and methyl methacrylate.

The monomers A) are preferably employed in an amount of from 10 to 90% by weight, in particular from 20 to 80% by weight.

It is also possible to employ different monomers A).

The monomers B) employed are those which form blocks B having a glass transition temperature of less than 0° C., selected from the group consisting of n-butyl acrylate, methyl acrylate and 2-ethylhexyl acrylate, preferably n-butyl acrylate.

The monomers B) are preferably employed in an amount of from 10 to 90% by weight, in particular from 20 to 80% by weight, the sum of the amounts of monomers A) and B) being 100% by weight.

Particularly preferred block copolymers are those composed of styrene or acrylonitrile or a mixture thereof and of n-butyl acrylate, or of methyl methacrylate and n-butyl acrylate.

It is also possible to employ different monomers B).

The monomers A) constitute one block A, the monomers B) a block B; the block copolymers can be diblock copolymers or else triblock copolymers, they are preferably uncrosslinked and in structure can be linear, for example A—B, A—B—A, B—A—B or $(A-B)_n$, star-shaped, for example $A(B)_n$, $B(A)_n$ or $(A)_n$—B—A—$(B)_m$, dendrimeric, for example $((A)_n-B)_mA$, $((B)_n-A)_mB$, $((A)_m-B)_nA)_pB$ or $((B)_m-A)_nB)_pA$ or comb-shaped, for example $((A)_n-A(B))_q$ or $((B)_n-B(A))_q$, where m, n and p are integers from 1 to 5 and q is an integer from 0 to 1000.

The blocks A and B each preferably have a molecular weight $M_w$ (weight-average) of from 1000 to 250,000, and are incompatible with one another.

The block copolymers preferably have a molecular weight distribution $M_w/M_n$ ($M_n$=number-average) of less than 3, especially less than 2. The individual blocks A and B likewise preferably have a molecular weight distribution $M_w/M_n$ of less than 3, especially less than 2.

Triblock polymers of the type A—B—A or B—A—B are particularly suitable, with a mixture of from 65 to 85% by weight, preferably from 70 to 80% by weight, of styrene and from 15 to 35% by weight, preferably from 20 to 30% by weight, of acrylonitrile as monomer A and from 50 to 100% by weight, preferably from 70 to 100% by weight, of n-butyl acrylate and from 0 to 50% by weight, preferably from 0 to 30% by weight, of one or more monomers from the group consisting of acrylonitrile, olefinic dienes such as butadiene, α,β-unsaturated carboxylic acids such as acrylic acid or methacrylic acid, and esters of such carboxylic acids, especially with $C_1$–$C_{10}$-alkanols, as monomer B, the molecular weight $M_w$ of the blocks A and B independently of one another being in each case from 5000 to 100,000, preferably from 30,000 to 70,000, such as triblock polymers of the type A—B—A with a mixture of 75% by weight of styrene and 25% by weight of acrylonitrile as monomer A and n-butyl acrylate as monomer B, the molecular weight $M_w$ of the blocks A and B being in each case 50,000.

The novel block copolymers are prepared by reacting the monomers A) and B) at from 100 to 160° C., preferably from 130 to 160° C., in the presence of free-radical initiators and N-oxyl radicals.

The free-radical initiators employed are known per se and are described, for example, in Ullmanns Encyclopädie der Technischen Chemie, 4th edition, volume 15, page 187. Depending on the polymerization technique it is possible to employ water-insoluble or water-soluble initiators. Particularly suitable are peroxides, such as dibenzoyl peroxide and cumene hydroperoxide, azo compounds, such as azodiisobutyronitrile, persulfates, such as potassium peroxodisulfate, but also redox initiators. It is also possible to employ mixtures of different free-radical initiators.

The molar amount of free-radical initiator can be from $10^{-6}$ to 1 mol/l, preferably from $10^{-4}$ to $10^{-1}$ mol/l, and is guided in a known manner by the desired molecular weight of the polymer.

N-oxyl radicals which can be employed are those as described in U.S. Pat. Nos. 5,322,912, 4,581,429 and 5,412,047. Preference is given to 2,2,6,6-tetramethyl-1-piperidinyloxy (TEMPO),
4-oxo-2,2,6,6-tetramethyl-1-piperidinyloxy (4-oxo-TEMPO),
4-hydroxy-2,2,6,6-tetramethyl-1-piperidinyloxy,
2,2,5,5-tetramethyl-1-pyrrolidinyloxy,
3-carboxy-2,2,5,5-tetramethylpyrrolidinyloxy and di-tert-butyl nitroxide.
2,6-Diphenyl-2,6-dimethyl-1-piperidinyloxy and
2,5-diphenyl-2,5-dimethyl-1-pyrrolidinyloxy can likewise be employed. Mixtures of different N-oxyl radicals can also be employed.

The molar ratio of the N-oxyl radical to the free-radical initiator is preferably from 0.5:1 to 5:1, in particular from 0.8:1 to 4:1.

The rate of polymerization can be increased in a known manner by adding organic acids, such as camphorsulfonic acid or p-toluenesulfonic acid (U.S. Pat. No. 5,322,912), or by adding dimethyl sulfoxide (U.S. Pat. No. 5,412,047).

The reaction conditions are not critical; it is normal to operate at atmospheric pressure but also possible to operate at pressures up to 30 bar. The reaction times are preferably chosen such that polymerization is carried out until the desired molecular weight is reached, examples being from 1 hour to 6 days.

Polymerization is preferably carried out in bulk, but it is also possible to use other polymerization techniques such as solution, suspension or emulsion processes.

Another possible procedure is to react either the monomers A) or the monomers B) with the free-radical initiator and the N-oxyl radical to prepare a block A or B, to isolate this block if desired, and then to add the monomers B) or A). An advantage of this method is that the initially prepared blocks can be stored without loss of activity. The polymerization of the initially prepared blocks with the other monomers can be carried out in solution, bulk, emulsion or suspension. Combined techniques such as bulk/solution, solution/precipitation, bulk/suspension or bulk/emulsion can likewise be employed. The formation of blocks can also take place in the melt, for example by extrusion. In the case of these techniques, it is not necessary to add any further amounts of free-radical initiator or N-oxyl radials.

The novel block copolymers can additionally include from 0 to 50% by weight, based on the sum of the percentages by weight of A) and B), of fibrous or particulate additives.

These may be, for example, glass fibers, flameproofing agents, stabilizers and antioxidants, thermal stabilizers, UV stabilizers, lubricants and mold release agents, dyes and pigments or plasticizers.

Glass fibers of E, A or C glass can be used. The glass fibers are in most cases treated with a size and a coupling agent. The diameter of the glass fibers is generally from 6 to 20 $\mu$m. It is possible to use both continuous fibers (rovings) and chopped glass fibers with a length of from 1 to 10 mm, preferably from 3 to 6 mm.

Pigments and dyes are generally present in amounts of up to 6% by weight, preferably from 0.5 to 5% by weight and, in particular, from 0.5 to 3% by weight, based on the monomers A) and B).

The pigments for coloring the thermoplastics are generally known; see, for example, R. Gächter and H. Müller, Taschenbuch der Kunststoffadditive, Carl Hanser Verlag, 1983, pp. 494–510. As a first preferred group of pigments, white pigments should be mentioned, such as zinc oxide, zinc sulfide, lead white ($2PbCO_3Pb(OH)_2$), lithopones, antimony white and titanium dioxide.

Black pigments which can be employed are iron oxide black ($Fe_3O_4$), spinel black ($Cu(Cr,Fe)_2O_4$), manganese black (mixture of manganese dioxide, silicon dioxide and iron oxide), cobalt black and antimony black, and also, with particular preference, carbon black, which is usually employed in the form of furnace black or gas black (in this context see G. Benzing, Pigmente für Anstrichmittel, Expert-Verlag (1988), p. 78 ff).

In order to establish particular colors it is of course possible to employ inorganic color pigments, such as chromium oxide green, or organic color pigments, such as azo pigments or phthalocyanines. Pigments of these kinds are generally available commercially.

Antioxidants and thermostabilizers which can be added to the block copolymers in accordance with the invention are, for example, halides of metals from group I of the Periodic Table, for example sodium, potassium, lithium halides, alone or in conjunction with copper(I) halides, for example the chlorides, bromides or iodides. The halides, especially those of copper, may also carry electron-rich p ligands. Examples of copper complexes of this kind which may be mentioned are Cu halide complexes with, for example, triphenylphosphine. Zinc fluoride or zinc chloride may also be used. Other compounds which may be employed are sterically hindered phenols, hydroquinones, substituted representatives of this group, secondary aromatic amines, alone or in conjunction with phosphorus-containing acids, and salts thereof, and mixtures of these compounds, preferably in concentrations of up to 1% by weight based on the monomers A) and B).

Examples of UV stabilizers are various substituted resorcinols, salicylates, benzotriazoles and benzophenones, which are generally employed in amounts of up to 2% by weight, based on the monomers A) and B).

Lubricants and mold release agents, which are generally added in amounts of up to 1% by weight to the block copolymers, are stearic acid, stearyl alcohol, alkyl stearates and stearamides, and also esters of pentaerythritol with long-chain fatty acids. It is also possible to employ salts of calcium, zinc or aluminum with stearic acid, and also dialkyl ketones, for example distearyl ketone.

Examples of plasticizers are dialkyl phthalates or else polymeric plasticizers, which must be homogeneously miscible with at least one of the monomers A) and B). The plasticizers can be added to the mixtures in amounts of up to 50% by weight based on the monomers A) and B).

The mixtures of the block copolymers with the additives can be prepared by methods known per se, by mixing the components in customary mixing apparatus, such as screw extruders, Brabender mills or Banbury mills, and then extruding the mixtures. Following extrusion, the extrudate is cooled and comminuted.

The novel block copolymers are notable for high impact strengths, especially at low temperatures. At the same time they have high weathering and ageing stability. Furthermore, they lend themselves to coloring and are also notable for a degree of transparency/translucency which leads to excellent colorability properties. In addition, they are suitable as impact modifiers in thermoplastic molding compositions.

They can be processed into moldings or films. They can also be applied, for example by means of known coextrusion techniques, in the form of layers (preferably in layer thicknesses of from 100 $\mu$m to 100 mm) to surfaces, preferably to thermoplastics such as styrene-acrylonitrile copolymers, acrylonitrile-butadiene-styrene terpolymers (ABS), ASA plastics, polystyrene, impact-modified polystyrene (HIPS), impact-modified polymethyl methacrylate or PVC. Also possible are mixtures of the block copolymers with thermoplastics such as styrene-acrylonitrile copolymers, polymethyl methacrylate, polystyrene, polycarbonate, polyphenylene ethers, polyamide, impact-modified polystyrene, acrylonitrile-butadiene-styrene copolymers (ABS), acrylonitrile-styreneacrylate copolymers (ASA) or mixtures thereof, by means of known injection-molding and extrusion techniques. They can be employed, for example, in the automotive sector, in the domestic field and for leisure articles. Thus they can be processed, for example, into automotive components, road signs, window profiles, lamp covers, garden furniture, boats, surfboards or toys. The films are suitable for the packaging sector and feature good resilience properties.

What is claimed is:
1. A process for producing a triblock copolymer having the structure A—B—A or B—A—B, wherein each of blocks

A and B has a weight average molecular weight of from 1,000 to 250,000 which consists essentially of polymerizing at least one monomer A) selected from the group consisting of styrene, α-methylstyrene, acrylonitrile, methacrylonitrile, methyl methacrylate and maleic anhydride to form blocks A having a glass transition temperature Tg of more than 0° C. and at least one monomer B) selected from the group consisting of n-butyl acrylate and 2-ethylhexyl acrylate to form blocks B having a glass transition temperature Tg of less than 0° C. at from 100 to 160° C. at pressures up to 30 bar in which blocks A and B are both produced in the presence of free-radical initiators and N-oxyl radicals.

2. A process as claimed in claim 1, wherein said at least one monomer A) is employed in an amount of from 10 to 90% by weight and said at least one monomer B) is employed in an amount of from 10 to 90% by weight.

3. A process as claimed in claim 1, wherein styrene or acrylonitrile or a mixture thereof is employed as said at least one monomer A) and n-butyl acrylate is employed as said at least one monomer B).

4. A process as claimed in claim 1, wherein methyl methacrylate is employed as said at least one monomer a) and n-butyl acrylate is employed as said at least one monomer B).

5. The process as claimed in claim 1, wherein said N-oxyl radicals are selected from the group consisting of 2,2,6,6-tetramethyl-1-piperidinyloxy (TEMPO),
4-oxo-2,2,6,6-tetramethyl-1-piperidinyloxy (4-oxo-TEMPO),
4-hydroxy-2,2,6,6-tetramethyl-1-piperidinyloxy,
2,2,5,5-tetramethyl-1-pyrrolidinyloxy,
3-carboxy-2,2,5,5-tetramethylpyrrolidinyloxy,
di-tert-butyinitroxide,
2,6-diphenyl-2,6-dimethyl-1-piperidinyloxy and
2,5-diphenyl-2,5-dimethyl-1-pyrrolidinyloxy.

* * * * *

UNITED STATES PATENT AND TRADEMARK OFFICE
CERTIFICATE OF CORRECTION

PATENT NO. : 6,239,226 B1
DATED : May 29, 2001
INVENTOR(S) : Fischer et al.

It is certified that error appears in the above-identified patent and that said Letters Patent is hereby corrected as shown below:

Column 6, claim 5,
Line 16, "butyinitroxide" should be -- butylnitroxide --.

Signed and Sealed this

Sixteenth Day of October, 2001

Attest:

NICHOLAS P. GODICI
Attesting Officer
Acting Director of the United States Patent and Trademark Office